US012737802B2

(12) United States Patent
Nejad et al.

(10) Patent No.: US 12,737,802 B2
(45) Date of Patent: Sep. 15, 2026

(54) GENERATING A USER INTERFACE FOR A USER OF AN ONLINE CONCIERGE METHOD, COMPUTER PROGRAM PRODUCT, AND SYSTEM TO SELECT GENERIC ITEM DESCRIPTIONS FOR AN ORDER AND TO SELECT SPECIFIC ITEMS CORRESPONDING TO THE SELECTED GENERIC ITEM DESCRIPTIONS

(71) Applicant: Maplebear Inc., San Francisco, CA (US)

(72) Inventors: Aref Kashani Nejad, Redmond, WA (US); Skyler Moses, Kirkland, WA (US); Logan William Murdock, San Francisco, CA (US); Evan Smith, Coronado, CA (US); Bonnie Hoang, Pasadena, CA (US); Nikita Pahadia, San Jose, CA (US); Rezwan Islam, Brisbane, CA (US)

(73) Assignee: Maplebear Inc., San Francisco, CA (US)

( * ) Notice: Subject to any disclaimer, the term of this patent is extended or adjusted under 35 U.S.C. 154(b) by 168 days.

(21) Appl. No.: 17/496,829

(22) Filed: Oct. 8, 2021

(65) Prior Publication Data

US 2023/0113386 A1 Apr. 13, 2023

(51) Int. Cl.
*G06Q 30/0601* (2023.01)

(52) U.S. Cl.
CPC ..... *G06Q 30/0633* (2013.01); *G06Q 30/0623* (2013.01); *G06Q 30/0641* (2013.01)

(58) Field of Classification Search
CPC ........... G06Q 30/0633; G06Q 30/0623; G06Q 30/0641

(Continued)

(56) References Cited

U.S. PATENT DOCUMENTS 9,741,007 B1 8/2017 Rouaix
10,163,070 B1 12/2018 Phillips et al.
(Continued)

FOREIGN PATENT DOCUMENTS

WO WO 2017/223298 A2 12/2017

OTHER PUBLICATIONS

Time domain launches groundbreaking retail technology. (Jan. 11, 2010). Business Wire Retrieved from https://dialog.proquest.com/professional/docview/443682298?accountid=131444 (Year: 2010).*
(Continued)

*Primary Examiner* — Ashley D Preston
(74) *Attorney, Agent, or Firm* — Fenwick & West LLP

(57) ABSTRACT

An online concierge system maintains a taxonomy associating one or more specific items offered by a warehouse with a generic item description. When the online concierge system receives a request to create an order from a user, the online concierge system selects a set of generic item descriptions from previously received orders and displays depictions of each generic item of the set to the user via an interface. In response to the user selecting a generic item description, the online concierge system identifies specific items associated with the selected generic item description from the taxonomy. Different identified specific items are displayed via the interface, for example as a scrollable list, allowing the user to select specific items for an order via the interface after selecting one or more generic item descriptions via the interface.

24 Claims, 6 Drawing Sheets

(58) Field of Classification Search
USPC ........................................ 705/26.8, 26.1–27.2
See application file for complete search history.

(56) References Cited

U.S. PATENT DOCUMENTS

| | | | | |
|---|---|---|---|---|
| 10,242,336 | B1 * | 3/2019 | Agarwal | G06Q 10/083 |
| 10,387,795 | B1 | 8/2019 | Oldridge et al. | |
| 10,438,164 | B1 | 10/2019 | Xiong et al. | |
| 10,748,072 | B1 | 8/2020 | Seeger et al. | |
| 11,544,810 | B2 * | 1/2023 | Rao | G06Q 10/087 |
| 2012/0179547 | A1 * | 7/2012 | Besore | F24H 15/414 705/14.66 |
| 2014/0279294 | A1 * | 9/2014 | Field-Darragh | H04B 5/77 705/28 |
| 2015/0012381 | A1 * | 1/2015 | Lazaro | G06Q 30/0633 705/26.8 |
| 2015/0012384 | A1 * | 1/2015 | Bank | G06Q 30/0633 705/26.41 |
| 2016/0042315 | A1 | 2/2016 | Field-Darragh et al. | |
| 2016/0050446 | A1 * | 2/2016 | Fujioka | G06F 16/9535 725/93 |
| 2017/0178221 | A1 | 6/2017 | Mccorry et al. | |
| 2019/0114689 | A1 * | 4/2019 | Wang | G06Q 30/0631 |
| 2019/0236531 | A1 | 8/2019 | Adato et al. | |
| 2021/0150571 | A1 * | 5/2021 | Singh | G06N 20/00 |

OTHER PUBLICATIONS

Recommender Systems: Behind the Scenes of Machine Learning-Based Personalization, Data Science (2021), (Year: 2021).*

Kutzelnigg, R. et al. "Optimal allocation of goods in a warehouse: Minimizing the order picking costs under real-life constraints," *IEEE International Symposium on Logistics and Industrial Informatics*, Aug. 25, 2011, pp. 65-70.

* cited by examiner

GENERATING A USER INTERFACE FOR A USER OF AN ONLINE CONCIERGE METHOD, COMPUTER PROGRAM PRODUCT, AND SYSTEM TO SELECT GENERIC ITEM DESCRIPTIONS FOR AN ORDER AND TO SELECT SPECIFIC ITEMS CORRESPONDING TO THE SELECTED GENERIC ITEM DESCRIPTIONS

BACKGROUND

This disclosure relates generally to ordering an item through an online concierge system, and more specifically to a user interface for selecting an item for inclusion in an order.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

To place an order through a conventional online concierge system, a user often has to navigate through long lists of items offered by a warehouse to identify a specific item to include in the order. Similarly, a user may provide multiple search queries to an online concierge system to identify specific items for the user to include in an order via the online concierge system. When a user frequently places orders through a conventional online concierge system, the user may spend a considerable amount of time navigating through listings of items offered by a warehouse or providing different search terms to the online concierge system to identify specific items for inclusion in an order. This increased time expended selecting items may decrease a frequency with which a user interacts with the online concierge system or a frequency with which the user subsequently places orders via the online concierge system.

Similarly, third party systems may have difficulty importing information to conventional online concierge system. For example, a third party system, such as a website, maintains recipes for access by the user. Such recipes include generic item descriptions, such as "milk" or "flour" as ingredients. This use of generic item descriptions complicates the third party system identifying items to a conventional online concierge system generates orders based on selection of specific items, and a generic item description may encompass multiple specific items, causing a user to again navigate through listings of items offered by a warehouse to select specific items for inclusion in an order.

SUMMARY

An online concierge system obtains a taxonomy of items offered by a warehouse from an item catalog received from the warehouse, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse in various embodiments. In other embodiments, the online concierge system maintains the taxonomy and applies a trained classification model to an item catalog received from a warehouse to include different items in levels of the taxonomy, so application of the trained classification model associates specific items with generic item descriptions corresponding to levels within the taxonomy.

Using the obtained taxonomy associating items with generic item descriptions, the online concierge system simplifies creation of an order by a user. For example, after receiving a request to create an order from a user that identifies a warehouse, the online concierge system retrieves a taxonomy for the identified warehouse, or a taxonomy maintained by the online concierge system and retrieves stored generic item descriptions in the obtained taxonomy. In another embodiment, when the user accesses the online concierge system, the online concierge system retrieves generic item descriptions from a taxonomy maintained by the online concierge system.

From the retrieved taxonomy, the online concierge system selects a set of generic item descriptions based on prior interactions by users with the online concierge system. If the user has previously purchased items via the online concierge system, the online concierge system retrieves one or more orders previously received from the user by the online concierge system and fulfilled by the online concierge system. In some embodiments, the online concierge system retrieves one or more orders previously received from the user within a specific time interval, such as within the specific time interval from a date when the online concierge system received the request from the user to create an order or from a date when the user accessed the online concierge system. The online concierge system identifies items included in the retrieved orders previously received from the user and determines a generic item description corresponding to each item included in a retrieved order from the obtained taxonomy. Based on frequencies with which generic item descriptions were included in retrieved orders, the online concierge system selects a set of generic item descriptions. In some embodiments, for each generic item description corresponding to an item included in a retrieved order, the online concierge system determines a percentage of the retrieved orders that include an item corresponding to the generic item description. The online concierge system selects a set of generic item descriptions included in at least a threshold percentage of the retrieved orders in some embodiments. Alternatively, the online concierge system ranks generic item descriptions corresponding to items included in retrieved orders, with a position in the ranking of a generic item description based on the percentage of retrieved orders including an item corresponding to the generic item description and selects a set of generic item descriptions having at least a threshold position in the ranking.

Additionally or alternatively, the online concierge system accounts for orders received from various users when selecting the set of generic item descriptions. For example, the online concierge system determines a location of the user from the request to create an order or from information obtained from the user. The online concierge system selects a geographic region including the location of the user and retrieves previously received orders from users having locations within the geographic region; in some embodiments, the online concierge system retrieves previously received orders that were received within a specific time interval and that identify locations within the geographic region. The online concierge system identifies items included in the retrieved orders and determines a generic item description corresponding to each item included in a retrieved order. As further described above, the online concierge system selects a set of generic item descriptions based on frequencies with which various generic item descriptions correspond to items included in received orders. In some embodiments, for each generic item description corresponding to an item included in a retrieved order, the online concierge system determines a percentage of the retrieved orders that include an item corresponding to the generic item description. The online concierge system selects a set of generic item descriptions included in at least a threshold percentage of the retrieved orders in some embodiments. Alternatively, the online concierge system ranks generic item descriptions corresponding to items included in retrieved orders, with a position in the ranking of a generic item description based on the percentage of retrieved orders including an item corresponding to the generic item description and selects a set of generic item descriptions having at least a threshold position in the ranking. The online concierge system may select a set of generic item descriptions from previously received orders from various users in response to determining that the online concierge system has received less than a threshold number of orders from the user or in response to determining that the online concierge system has not received an order from the user within a threshold time interval.

The online concierge system displays information describing the set of generic item descriptions to the user in an interface. For example, the online concierge system displays an image and a name of a generic item description in the interface. In various embodiments, the interface includes a specific region in which information describing generic item descriptions is displayed to simplify location and identification of the information describing various generic item descriptions by the user. For example, the interface includes a horizontal row in which information describing generic item descriptions of the set is displayed. By providing one or more inputs via the interface, the user horizontally scrolls through the information describing generic item descriptions displayed via the interface, allowing the user to identify different generic item descriptions of the set by interacting with the interface. In other embodiments, the interface displays information describing different generic item descriptions in a grid, in a vertically scrollable list, or in any suitable format.

The online concierge system receives a selection of a generic item description of the set from the user via a client device displaying the interface. For example, the user selects a description of a generic item description displayed by the interface via the customer mobile application on a client device, and the client device transmits an identifier of the selected generic item description to the online concierge system. From the obtained taxonomy, the online concierge system identifies specific items associated with the selected generic item description and displays a set of identified specific items associated with the selected generic item description via the interface. In various embodiments, the online concierge system modifies the interface to display an identifier of the selected generic item description along a first axis and displays information describing each of the set of identified specific items along a second axis that is orthogonal to the first axis. For example, the interface displays an identifier of the selected generic item description in a position along a vertical axis and displays information identifying different specific items associated with the selected generic item description in positions along a horizontal axis that are proximate to the identifier of the selected generic item description.

In various embodiments, the online concierge system may account for prior inclusion of specific items within associated with the selected generic item description by other users of the online concierge system. For example, the online concierge system identifies a set of specific items associated with the selected generic item description received from the user that were included in at least a threshold number or a threshold percentage of orders previously received from the user (e.g., orders received by the online concierge system within a specific time interval) or that were included in at least a threshold number or a threshold percentage of orders received from various users of the online concierge system. The online concierge system may account for a location identified by the request to create the order or associated with the user when identifying the set of specific items in some embodiments and identifies specific items associated with the selected generic item description that were included in at least at a threshold number or a threshold percentage of previously received orders (e.g., orders received by the online concierge system within a specific time interval) that identified locations within a threshold distance of a location identified by the request to create the order or within a threshold distance of a location associated with the user.

In other embodiments, the online concierge system applies a trained purchase model to specific items associated with the selected generic item description. The trained purchase model outputs a probability of the user purchasing a specific item. The trained purchase model accounts for times when the user previously purchased a specific item, such as a relative time from a previously received order including the specific item to a time when the purchase model is applied, as well as attributes of the specific item (e.g., a type of the specific item, a quantity or an amount of the specific item that was previously purchased, a brand of the specific item). The trained purchase model may include a decay constant that decreases a weighting of purchases of specific items over time, so purchases of a specific item at longer time intervals from the time when the trained purchase model is applied have lower weights than weights of purchases at the specific item at shorter time intervals from the time when the trained purchase model is applied. Additionally, the trained purchase model accounts for a frequency with which the user purchases a specific item, which increases a likelihood of the user purchasing a specific item if the user more frequently purchases the specific item. Other example factors used by the trained purchase model to determine the likelihood of a user purchasing a specific item include: a time interval between prior orders including the specific item received from the user, a frequency with which the specific item is included in prior orders received from the user, times when orders including the specific item were previously received from the user, preferences of the user, and any other suitable information. The trained purchase model may be trained using any suitable method or combination of methods (e.g., supervised learning, unsupervised learning, semi-supervised learning, etc.). In some embodiments, the online concierge system applies the trained purchase model to each combination of the user and an identified item associated with the selected generic item description and ranks the specific items based on their corresponding probabilities of being purchased by the user. Based on a number of positions available for display in the interface, the online concierge system displays information identifying a corresponding number of identified specific items based on the ranking. This allows the online concierge system to identify from the ranking specific items having higher probabilities of being purchased by the user for display in the positions of the interface available for display, optimizing use of the available display space of the interface to display specific items most likely to be purchased by the user. In various embodiments, the online concierge system also accounts for predicted availabilities of the specific items associated with the selected generic item description by applying a machine-learned availability model to specific items associated with the selected generic item description. The online concierge system displays specific items associated with the selected generic item description having at least a threshold predicted availability at the warehouse in an order based on their ranking based on probability of being purchased by the user in various embodiments. In some embodiments, the trained purchase model accounts for a difference between a probability of the user purchasing a specific item associated with the selected generic item description that was included one or more previous orders and a probability of the user purchasing a different specific item associated with the selected generic item description. For example, the online concierge system ranks other items associated with the selected generic item description based on differences between a probability of the user purchasing a specific item associated with the selected generic item description and a probability of the user purchasing a specific item associated with the selected generic item description that was previously purchased by the user (e.g., a specific item that was most recently purchased by the user) so specific items having smaller differences have higher positions in the ranking. The online concierge system displays a set of specific items having at least a threshold position in the ranking. This allows the online concierge system to maximize a probability of the user purchasing a specific item associated with the selected generic item description differing from a specific item associated with the selected generic item description that was included in a previous order when displaying information describing each of a set of specific items associated with the selected generic item description.

The online concierge system applies the machine-learned item availability model to the specific items associated with the selected generic item description and a warehouse identified by the request to create the order, to determine a predicted availability of different specific items associated with the selected generic item description at the warehouse identified for fulfilling the order. In various embodiments, the online concierge system identifies a group of specific items associated with the selected generic item description having at least a threshold availability and ranks the specific items associated with the selected generic item description of the group based on probabilities of the user purchasing each item of the group; the online concierge system displays information describing a set of specific items associated with the selected generic item description of the group having at least a threshold probability of being purchased by the user or having at least a threshold position in a ranking based on their probabilities of being purchased by the user. In another embodiment, the online concierge system ranks specific items associated with the selected generic item description based on their predicted availabilities and identifies a group of specific items associated with the selected generic item description having at least a threshold position in the ranking; the online concierge system displays information describing specific items of the group via the interface.

This interface allows a user to generate an order via the interface by selecting generic item descriptions via the interface and selecting specific items associated with one or more of the selected generic item descriptions displayed to the user via the interface. When the online concierge system receives a selection of an additional generic item description from the user via the interface, the online concierge system identifies additional specific items each associated with the additional generic item description, as further described above. This online concierge system modifies the interface to display the additional specific items associated with the generic item description. In various embodiments, the online concierge system displays identifiers of selected generic item descriptions in different positions along an axis of the interface. For a selected generic item description, the interface displays specific items associated with the selected generic item description in different slots of a position corresponding to the selected generic item description, with different slots of the position along an additional axis that is perpendicular to the axis of the positions. In some embodiments, the interface vertically displays information identifying selected generic item descriptions and horizontally displays specific items associated with a selected generic item description. Such a configuration allows the user to more easily generate an order from a warehouse by initially selecting one or more generic item descriptions from the interface and subsequently reviewing or selecting specific items associated with a selected generic item description from the interface. Ordering display of generic item descriptions or specific items corresponding to a selected generic item description within the interface so generic item descriptions more frequently included in orders by the user or specific items more likely to be purchased or more likely to be available at a specified warehouse are more prominently displayed or are more readily accessible to the user allows the online concierge system to reduce a number of inputs from the user to create and order and simplify identification of relevant generic item descriptions or specific items to the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
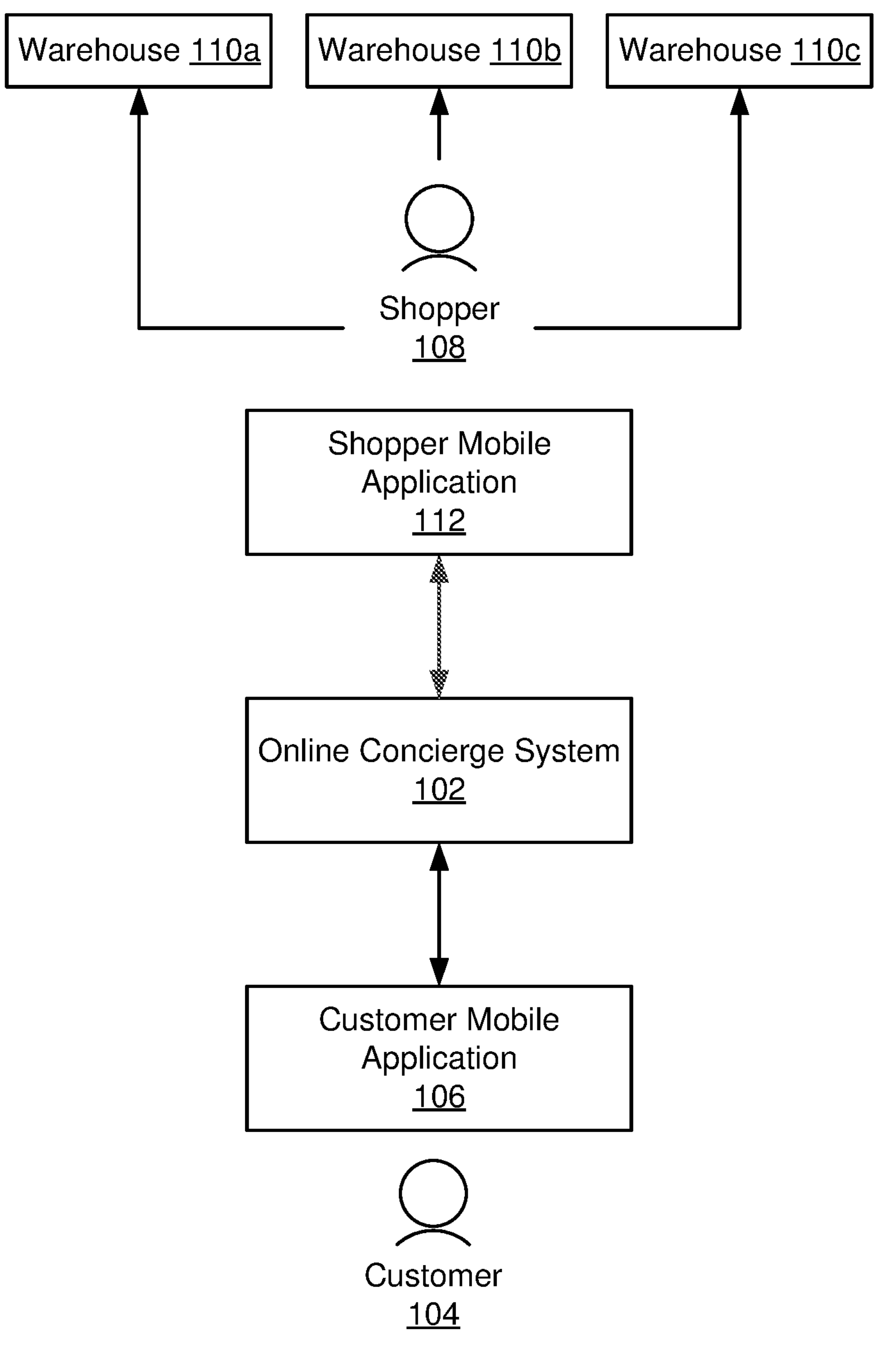
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
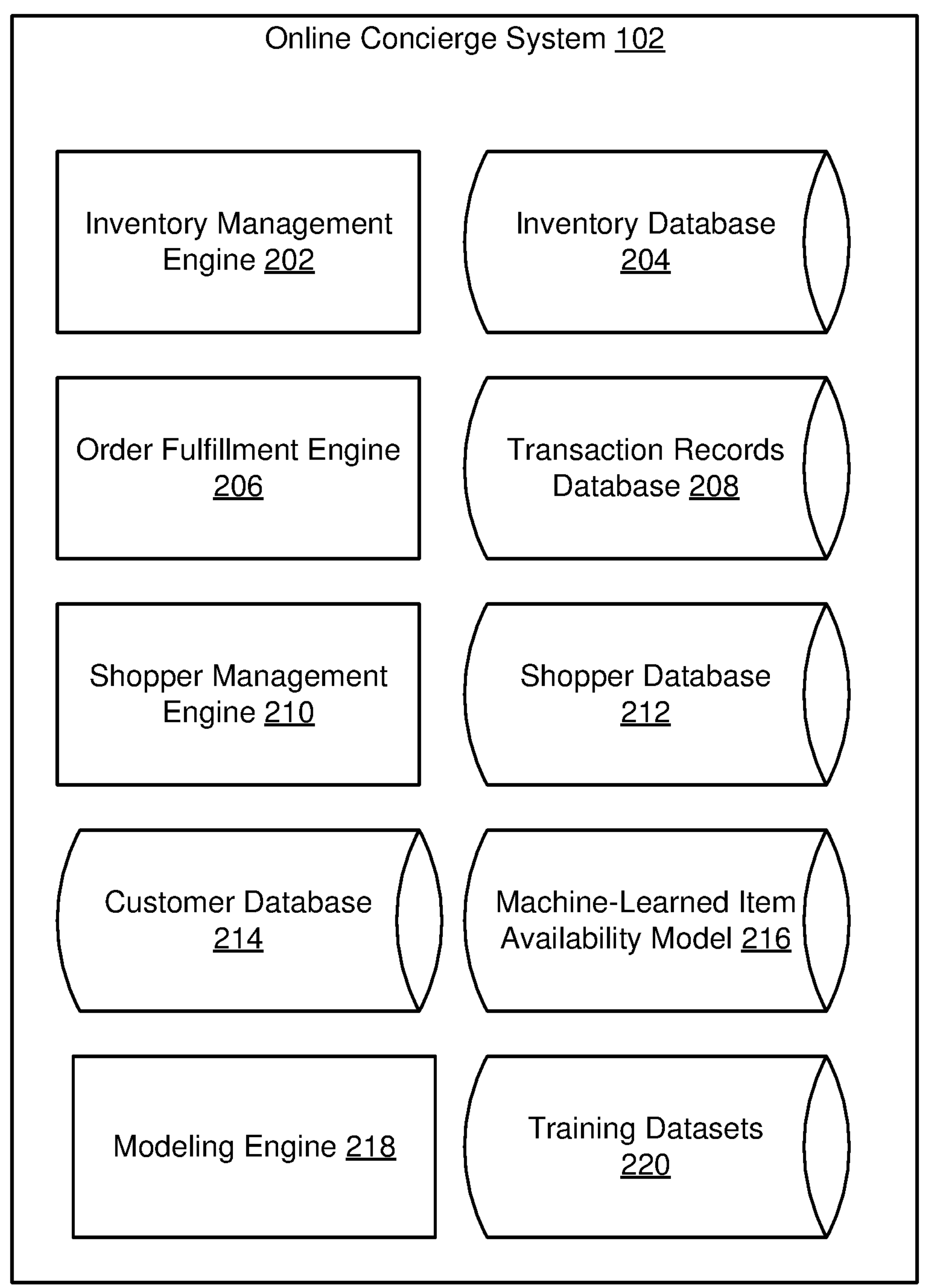
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 leverages a taxonomy of items maintained by the inventory management engine 202 to simplify order creation for a user. In various embodiments, the order fulfillment engine 206 generates an interface for a user identifying generic item description in response to receiving a request to create an order from the user. As further described below in conjunction with FIGS. 4-6, the order fulfillment engine 206 accounts for items included in prior orders from the user or from other users and selects generic item descriptions to display to the user via the interface from generic item descriptions associated in the taxonomy with items included in the previously received orders. The interface displays depictions of a set of generic item descriptions selected from the previously received orders.

In response to receiving a selection of a generic item description from the user via the interface, the order fulfillment engine 206 identifies specific items associated with the selected generic item description from the taxonomy. The order fulfillment engine 206 modifies the interface to display an identifier of the selected generic item description and to display specific items associated with the selected generic item description. As further described below in conjunction with FIGS. 5 and 6, the updated interface continues displaying depictions of the set of generic item descriptions, while identifying the selected generic item description and specific items associated with the selected generic item description by the taxonomy. In various embodiments, the interface displays identifiers of selected generic item descriptions along an axis and displays specific items associated with a generic item description in slots positioned along an additional axis that is perpendicular to the axis. Interactions with the interface allow the user to scroll through generic item descriptions or to scroll through specific items associated with a selected generic item description and to select a specific item for inclusion in an order. Hence, the interface allows the order fulfillment engine 206 to better leverage available display space to display specific items or generic item descriptions likely to be relevant or likely to be selected by the user based on prior interactions, simplifying input provided by the user to create an order.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model that outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
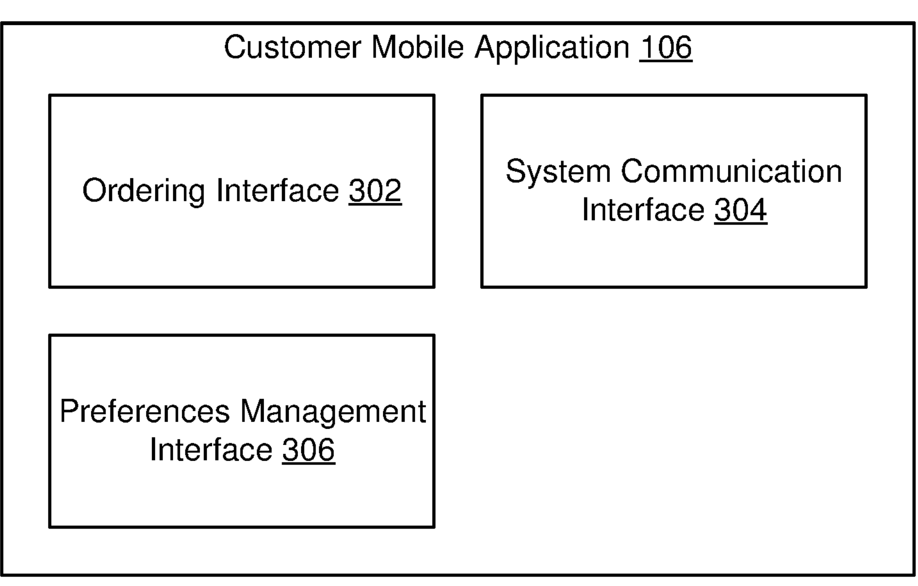
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
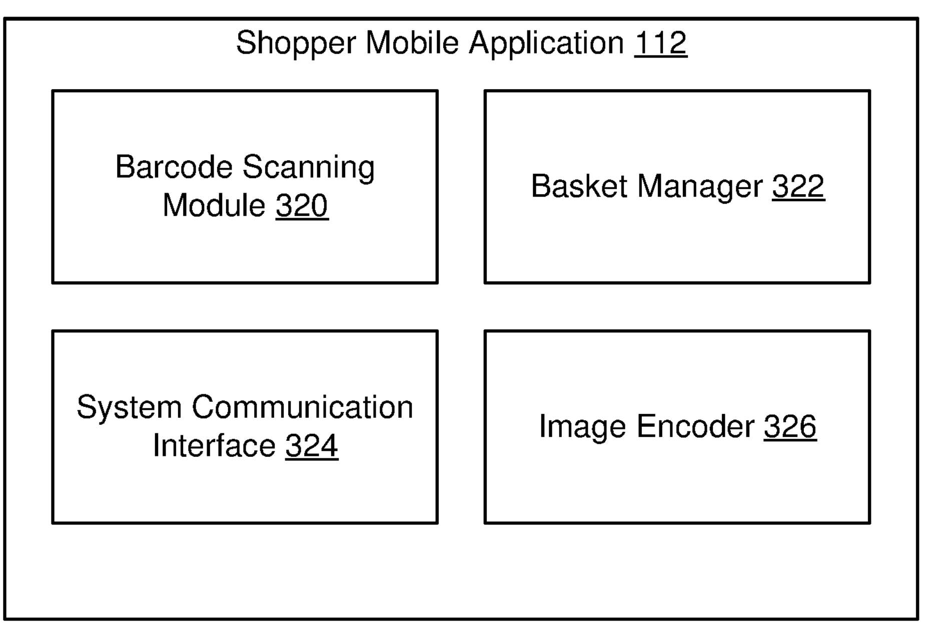
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket." In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
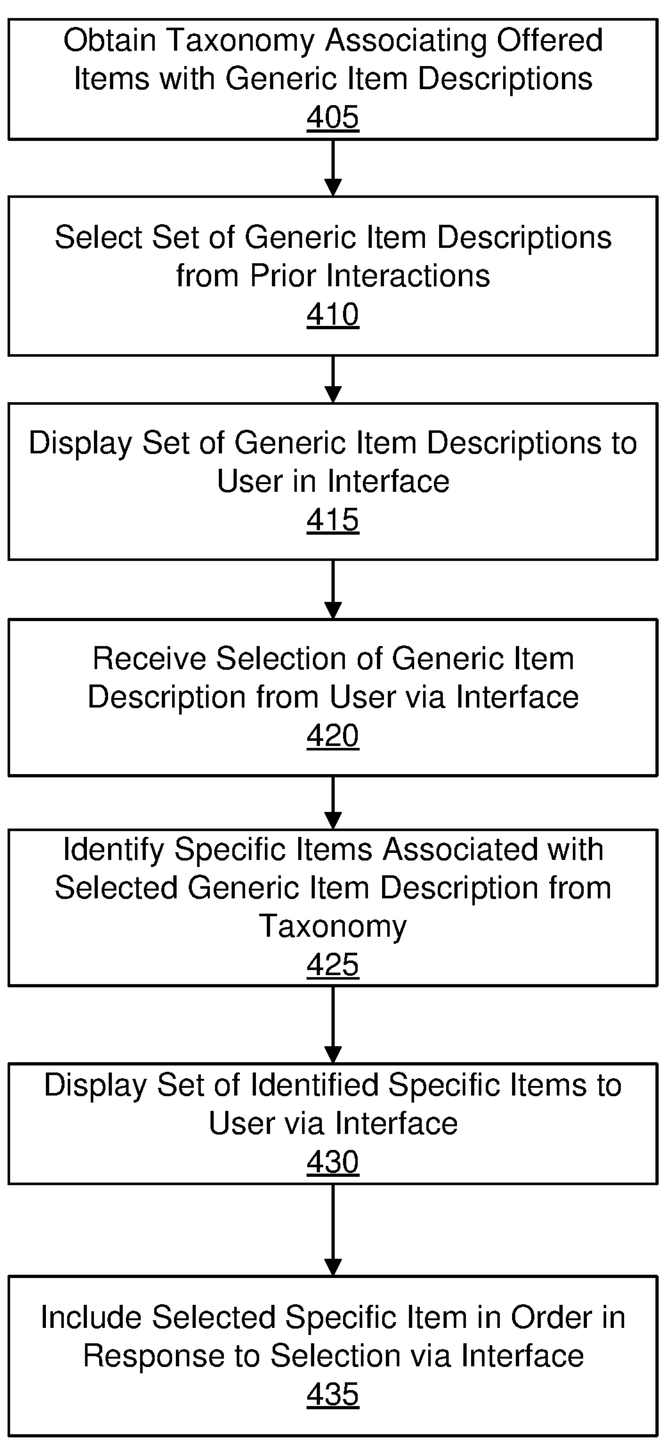
FIG. 4 is a flowchart of a method for an online concierge system generating an interface for a user to select one or more items for inclusion in an order, according to one embodiment.

Selecting an Item for an Order from One or More Generic Item Descriptions in an Interface FIG. 4 is a flowchart of one embodiment of a method for an online concierge system 102 generating an interface for a user to select one or more items for inclusion in an order. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

The online concierge system 102 obtains 405 a taxonomy of items offered by a warehouse 110 from an item catalog received from the warehouse 110, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the online concierge system 102 maintains the taxonomy and applies a trained classification model to an item catalog received from a warehouse 110 to include different items in levels of the taxonomy, so application of the trained classification model associates specific items with generic item descriptions corresponding to levels within the taxonomy.

Using the obtained taxonomy associating items with generic item descriptions, the online concierge system 102 simplifies creation of an order by a user of the online concierge system 102. For example, after receiving a request to create an order from a user that identifies a warehouse 110, the online concierge system 102 retrieves a taxonomy for the identified warehouse 110 or a taxonomy maintained by the online concierge system 102 and retrieves stored generic item descriptions in the obtained taxonomy. In another embodiment, when the user accesses the online concierge system 102, the online concierge system 102 retrieves generic item descriptions from a taxonomy maintained by the online concierge system 102.

From the retrieved taxonomy, the online concierge system 102 selects 410 a set of generic item descriptions based on prior interactions by users with the online concierge system 102. If the user has previously purchased items via the online concierge system 102, the online concierge system 102 retrieves one or more orders previously received from the user by the online concierge system 102 and fulfilled by the online concierge system 102. In some embodiments, the online concierge system 102 retrieves one or more orders previously received from the user within a specific time interval, such as within the specific time interval from a date when the online concierge system 102 received the request from the user to create an order or from a date when the user accessed the online concierge system 102. The online concierge system 102 identifies items included in the retrieved orders previously received from the user and determines a generic item description corresponding to each item included in a retrieved order from the obtained taxonomy. Based on frequencies with which generic item descriptions were included in retrieved orders, the online concierge system 102 selects 410 a set of generic item descriptions. In some embodiments, for each generic item description corresponding to an item included in a retrieved order, the online concierge system 102 determines a percentage of the retrieved orders that include a generic item description. The online concierge system 102 selects 410 a set of generic item descriptions included in at least a threshold percentage of the retrieved orders in some embodiments. Alternatively, the online concierge system 102 ranks generic item descriptions corresponding to items included in retrieved orders, with a position in the ranking of a generic item description based on the percentage of retrieved orders including an item corresponding to the generic item description and selects 410 a set of generic item descriptions having at least a threshold position in the ranking.

Additionally or alternatively, the online concierge system 102 accounts for orders received from various users when selecting 410 the set of generic item descriptions. For example, the online concierge system 102 determines a location of the user from the request to create an order or from information obtained from the user. The online concierge system 102 selects a geographic region including the location of the user and retrieves previously received orders from users having locations within the geographic region; in some embodiments, the online concierge system 102 retrieves previously received orders that were received within a specific time interval (as further described above) and that identify locations within the geographic region. The online concierge system 102 identifies items included in the retrieved orders and determines a generic item description corresponding to each item included in a retrieved order. As further described above, the online concierge system 102 selects 410 a set of generic item descriptions based on frequencies with which various generic item descriptions correspond to items included in received orders. In some embodiments, for each generic item description corresponding to an item included in a retrieved order, the online concierge system 102 determines a percentage of the retrieved orders that include a generic item description. The online concierge system 102 selects 410 a set of generic item descriptions included in at least a threshold percentage of the retrieved orders in some embodiments. Alternatively, the online concierge system 102 ranks generic item descriptions corresponding to items included in retrieved orders, with a position in the ranking of a generic item description based on the percentage of retrieved orders including an item corresponding to the generic item description and selects 410 a set of generic item descriptions having at least a threshold position in the ranking. The online concierge system 102 may select 410 a set of generic item descriptions from previously received orders from various users in response to determining that the online concierge system 102 has received less than a threshold number of orders from the user or in response to determining that the online concierge system 102 has not received an order from the user within a threshold time interval.

The online concierge system 102 may retrieve orders that identify locations in various geographic region and select 410 the set of generic item descriptions from the retrieved orders, as further described above, allowing the online concierge system 102 to account for inclusion of items in orders by users in various locations. In various embodiments, the online concierge system 102 selects 410 the set of generic item descriptions from both orders previously received from the user and from orders previously received from other users. For example, the set of generic item descriptions includes generic item descriptions selected 410 from items previously included in orders received from the user and one or more generic item descriptions 410 selected from items previously included in orders received from one or more other users.

In some embodiments, the online concierge system 102 selects 410 a predetermined list of generic item descriptions as the set. For example, in response to the online concierge system 102 determining that less than a threshold number of orders have previously been received from the user, the online concierge system 102 selects a predetermined list of generic item descriptions as the set. The online concierge system 102 maintains different predetermined lists of generic items for different geographic regions in some embodiments, identifies a predetermined list of generic items for a geographic region including the location specified by the request to create the order, and selects 410 the identified predetermined list of generic items as the set.

The online concierge system 102 may select 410 the set of generic item descriptions based on a recipe. A recipe includes generic item descriptions, quantities corresponding to different generic item descriptions, and instructions for combining generic item descriptions. The recipe may be obtained from a third party system, such as a website or application, or may be stored by the online concierge system 102. The online concierge system 102 selects 410 the set of generic item descriptions as generic item descriptions in the recipe. In some embodiments, the online concierge system 102 receives a selection of a recipe in the request to create the order and selects 410 the set of generic item descriptions as generic item descriptions included in the selected recipe. As another example, the online concierge system 102 identifies recipes previously accessed by the user and selects a recipe with which the user had at least a threshold amount of interaction or a recipe that the user most recently accessed and selects 410 the set of genre items as generic item descriptions included in the selected recipe. In other embodiments, the online concierge system 102 selects a recipe based on interaction with recipes by various users of the online concierge system 102. For example, the online concierge system 102 determines amounts of interaction by users associated with locations within the geographic region of a location associated with the user and selects a recipe having a maximum amount of interaction by users associated with locations within the geographic region of the location associated with the user or selects a recipe with which a maximum number (or percentage) of users associated with locations within the geographic region of the location associated with the user most recently interacted; the online concierge system 102 selects 410 the set of generic item descriptions as generic item descriptions included in the selected recipe. In other embodiments, the online concierge system 102 selects a recipe based on amounts of interaction by users associated with locations in multiple geographic regions and selects 410 the set of generic item descriptions as generic item descriptions included in the selected recipe.

The online concierge system 102 displays 415 information describing the set of generic item descriptions to the user in an interface. For example, the online concierge system 102 displays an image and a name of a generic item description in the interface. In various embodiments, the interface includes a specific region in which information describing generic item descriptions is displayed to simplify location and identification of the information describing various generic item descriptions by the user. For example, the interface includes a horizontal row in which information describing generic item descriptions of the set is displayed 415. By providing one or more inputs via the interface, the user horizontally scrolls through the information describing generic item descriptions displayed via the interface, allowing the user to identify different generic item descriptions of the set by interacting with the interface. In other embodiments, the interface displays 415 information describing different generic item descriptions in a grid, in a vertically scrollable list, or in any suitable format.

Figure 5:
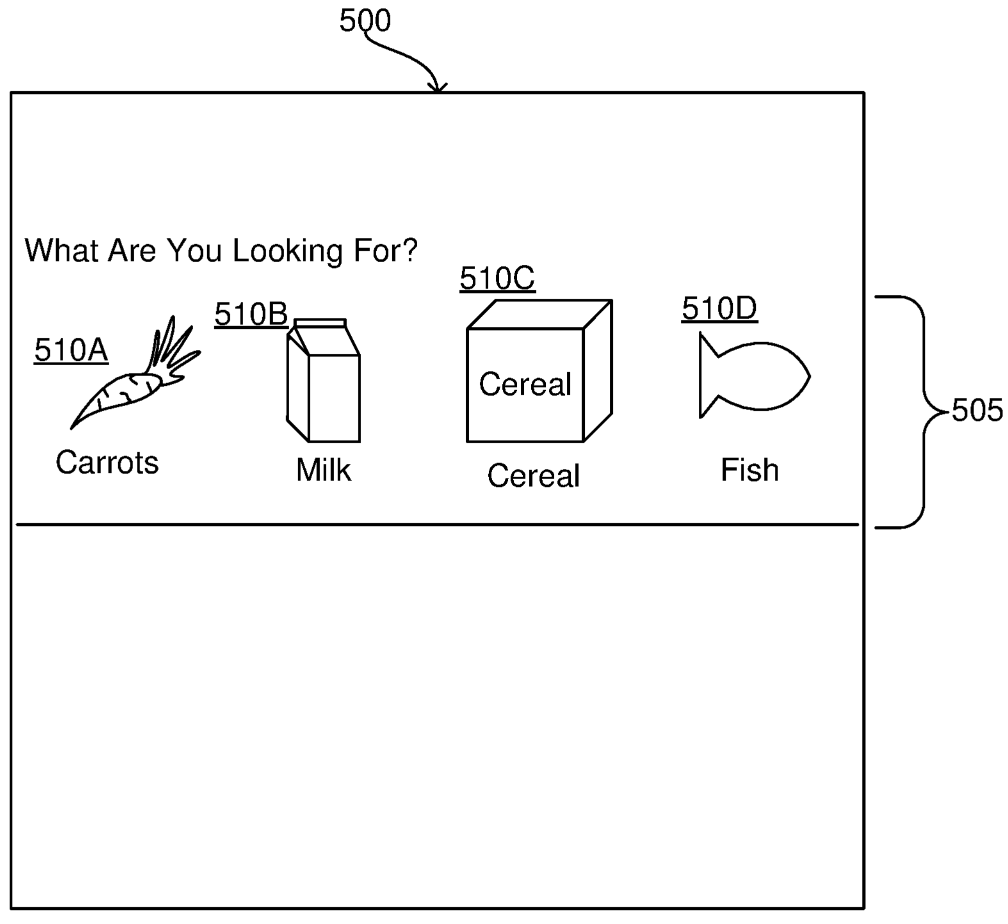
FIG. 5 is an example interface displaying information describing different generic item descriptions selected by the online concierge system, in accordance with an embodiment.

FIG. 5 shows an example interface 500 displaying information describing different generic item descriptions selected by the online concierge system 102. The interface 500 shown in FIG. 5 is displayed to a user in response to the online concierge system 102 receiving a request to create an order from the user in some embodiments. For example, the interface 500 is displayed to the user via a customer mobile application 106 displayed to the user via a client device in response to the online concierge system 102 receiving a request to create an order that identifies a warehouse 110 for the order. In other embodiments, the online concierge system 102 displays the interface 500 to the user when the user initially accesses the online concierge system 102, while in other embodiments, the interface 500 may be displayed to the user after receiving a request to create an order and before the user identifies a warehouse 110 for fulfilling the order.

As further described above in conjunction with FIG. 4, the online concierge system 102 selects a set of generic item descriptions based on prior interactions with the online concierge system 102. For example, generic item descriptions of the set are generic item descriptions corresponding to specific items included in one or more orders previously received from the user. In other examples, generic item descriptions of the set correspond to items included in one or more orders previously received from at least one user of the online concierge system 102 (or previously received from at least one user of the online concierge system 102 having one or more characteristics in common with the user). The interface 500 includes a generic item description region 505 in which depictions 510A, 510B, 510C, 510D (also referred to individually and collectively using reference number 510) of different generic item descriptions of the set are displayed. In the example of FIG. 5, the generic item description region 505 is a horizontally scrollable list including multiple positions, with each position displaying a depiction 510 of a generic item description of the set. In various embodiments, the generic item description region 505 displays depictions 510 of items in a determined order. For example, the online concierge system 102 ranks generic items based on a percentage of previously received orders including items corresponding to different generic item descriptions, with generic item descriptions having higher percentages of previously received orders including a corresponding item having higher positions in the ranking. The generic item description region 505 displays depictions 510 of generic item descriptions of the set in an order based on the ranking, with depictions 510 of generic item descriptions of the set having higher positions in the ranking displayed in more prominent or more readily accessible positions of the generic item description region 505.

Receiving an input with the generic item description region 505 (e.g., a gesture in a first horizontal direction) causes the generic item description region 505 to scroll horizontally in a first direction and display additional depiction 510 of generic item descriptions of the set, while receiving an alternative input with generic item description region 505 (e.g., a gesture in a second horizontal direction) causes the generic item description region 505 to scroll horizontally in a second direction and display additional depictions 510 of generic item descriptions of the set. In some embodiment, the generic item description region 505 displays a specific number of depictions 510 of generic item descriptions of the set and replaces a displayed depiction 510 of a generic item description of the set with an alternative depiction 510 of a different generic item description of the set in response to receiving the input or the alternative input described above. In the example of FIG. 5, a depiction 510 of a generic item description of the set comprises an image and a name or other text corresponding to the generic item description of the set. However, in other embodiments, the interface 500 displays any suitable content as a depiction 510 of a generic item description to display information describing different generic item descriptions of the set to the user.

Referring back to FIG. 4, the online concierge system 102 receives 420 a selection of a generic item description of the set from the user via a client device displaying the interface. For example, the user selects a description of a generic item description displayed by the interface via the customer mobile application 106 on a client device, and the client device transmits an identifier of the selected generic item description to the online concierge system 102. From the obtained taxonomy, the online concierge system 102 identifies 425 specific items associated with the selected generic item description and displays 430 a set of identified specific items associated with the selected generic item description via the interface. In various embodiments, the online concierge system 102 modifies the interface to display an identifier of the selected generic item description along a first axis and displays 430 information describing each of the set of identified specific items along a second axis that is orthogonal to the first axis. For example, the interface displays an identifier of the selected generic item description in a position along a vertical axis and displays 430 information identifying different specific items associated with the selected generic item description in positions along a horizontal axis that are proximate to the identifier of the selected generic item description.

In various embodiments, the online concierge system 102 may account for prior inclusion of specific items within associated with the selected generic item description by other users of the online concierge system 102. For example, the online concierge system 102 identifies 425 a set of specific items associated with the selected generic item description received from the user that were included in at least a threshold number or a threshold percentage of orders previously received from the user (e.g., orders received by the online concierge system 102 within a specific time interval) or that were included in at least a threshold number or a threshold percentage of orders received from various users of the online concierge system 102. The online concierge system 102 may account for a location identified by the request to create the order or associated with the user when identifying 425 the set of specific items in some embodiments and identifies 425 specific items associated with the selected generic item description that were included in at least at a threshold number or a threshold percentage of previously received orders (e.g., orders received by the online concierge system 102 within a specific time interval) that identified locations within a threshold distance of a location identified by the request to create the order or within a threshold distance of a location associated with the user.

In other embodiments, the online concierge system 102 applies a trained purchase model to specific items associated with the selected generic item description. The trained purchase model outputs a probability of the user purchasing a specific item. The trained purchase model accounts for times when the user previously purchased a specific item, such as a relative time from a previously received order including the specific item to a time when the purchase model is applied, as well as attributes of the specific item (e.g., a type of the specific item, a quantity or an amount of the specific item that was previously purchased, a brand of the specific item). The trained purchase model may include a decay constant that decreases a weighting of purchases of specific items over time, so purchases of a specific item at longer time intervals from the time when the trained purchase model is applied have lower weights than weights of purchases at the specific item at shorter time intervals from the time when the trained purchase model is applied. Additionally, the trained purchase model accounts for a frequency with which the user purchases a specific item, which increases a likelihood of the user purchasing a specific item if the user more frequently purchases the specific item. Other example factors used by the trained purchase model to determine the likelihood of a user purchasing a specific item include: a time interval between prior orders including the specific item received from the user, a frequency with which the specific item is included in prior orders received from the user, times when orders including the specific item were previously received from the user, preferences of the user, and any other suitable information. The trained purchase model may be trained using any suitable method or combination of methods (e.g., supervised learning, unsupervised learning, semi-supervised learning, etc.). In some embodiments, the online concierge system 102 applies the trained purchase model to each combination of the user and an identified item associated with the selected generic item description and ranks the specific items based on their corresponding probabilities of being purchased by the user. Based on a number of positions available for display in the interface, the online concierge system 102 displays 430 information identifying a corresponding number of identified specific items based on the ranking. This allows the online concierge system 102 to identify from the ranking specific items having higher probabilities of being purchased by the user for display in the positions of the interface available for display, optimizing use of the available display space of the interface to display 430 specific items most likely to be purchased by the user. In various embodiments, the online concierge system 102 also accounts for predicted availabilities of the specific items associated with the selected generic item description by applying the machine-learned availability model 216, further described above on conjunction with FIG. 2, to specific items associated with the selected generic item description. The online concierge system 102 displays 430 specific items associated with the selected generic item description having at least a threshold predicted availability at the warehouse in an order based on their ranking based on probability of being purchased by the user in various embodiments. In some embodiments, the trained purchase model accounts for a difference between a probability of the user purchasing a specific item associated with the selected generic item description that was included one or more previous orders and a probability of the user purchasing a different specific item associated with the selected generic item description. For example, the online concierge system 102 ranks other items associated with the selected generic item description based on differences between a probability of the user purchasing a specific item associated with the selected generic item description and a probability of the user purchasing a specific item associated with the selected generic item description that was previously purchased by the user (e.g., a specific item that was most recently purchased by the user) so specific items having smaller differences have higher positions in the ranking. The online concierge system 102 displays 430 a set of specific items having at least a threshold position in the ranking. This allows the online concierge system 102 to maximize a probability of the user purchasing a specific item associated with the selected generic item description differing from a specific item associated with the selected generic item description that was included in a previous order when displaying 430 information describing each of a set of specific items associated with the selected generic item description.

The online concierge system 102 applies the machine-learned item availability model 216, further described above in conjunction with FIG. 2, to the specific items associated with the selected generic item description and a warehouse 110 identified by the request to create the order, to determine a predicted availability of different specific items associated with the selected generic item description at the warehouse 110 identified for fulfilling the order. In various embodiments, the online concierge system 102 identifies a group of specific items associated with the selected generic item description having at least a threshold availability and ranks the specific items associated with the selected generic item description of the group based on probabilities of the user purchasing each item of the group; the online concierge system 102 displays 430 information describing a set of specific items associated with the selected generic item description of the group having at least a threshold probability of being purchased by the user or having at least a threshold position in a ranking based on their probabilities of being purchased by the user. In another embodiment, the online concierge system 102 ranks specific items associated with the selected generic item description based on their predicted availabilities and identifies a group of specific items associated with the selected generic item description having at least a threshold position in the ranking. The online concierge system 102 then displays 430 information describing specific items of the group via the interface. Alternatively, the online concierge system 102 retrieves information stored in association with a specific item associated with the selected generic item description that was previously purchased by the user and displays 430 one or more replacement specific items stored in association with the user for the identified specific item. The online concierge system 102 may account for probabilities of the user purchasing various replacement specific items of the set if multiple replacement specific items for an item associated with the selected generic item description previously purchased by the user are stored in association with the user; for example, the online concierge system 102 displays replacement specific items stored in association with the user having at least a threshold probability of being purchased by the user or having at least a threshold predicted availability at the warehouse 110 identified by the received request to create an order.

In some embodiments, an entity associated with a specific item associated with the selected generic item description provides the online concierge system 102 with compensation for displaying 430 the selected specific item associated with the selected generic item description. Example entities associated with a specific item include a warehouse 110 from which the specific item is obtained, a manufacturer of the specific item, a brand offering the specific item, or any other suitable entity. The online concierge system 102 receives compensation from the entity for displaying 430 information describing the specific item to users via the interface. Alternatively, the online concierge system 102 receives compensation from the entity for the user including the specific item in an order and completing the order including the specific item to purchase the specific item. The online concierge system 102 may account for compensation received from one or more entities when displaying 430 information identifying one or more specific items associated with the generic item description in various embodiments. For example, the online concierge system 102 determines expected values for various specific items associated with the selected generic item description for which the online concierge system 102 receives compensation as a product of an amount of compensation received for displaying 430 information describing a specific item or for a user purchasing the specific item and a probability of the user purchasing the item. The online concierge system 102 displays 430 information identifying one or more specific items associated with the selected generic item description via the interface, such as a specific item associated with the selected generic item description having a maximum expected value or a specific item associated with the selected generic item description having at least a threshold position in a ranking of specific items associated with the selected generic item description and displays 430 information identifying one or more specific items associated with the selected generic item description having at least a threshold position in the ranking. In some embodiments, the online concierge system 102 converts a probability of the user purchasing an item associated with the selected generic item description and an amount of compensation the online concierge system 102 receives for displaying 430 information describing the specific item associated with the selected generic item description (or for the user purchasing the specific item associated with the selected generic item description) into a common unit of measurement. For example, the online concierge system 102 applies a conversion factor to the probability of the user purchasing a specific item associated with the selected generic item description that converts the probability of the user purchasing the specific item associated with the selected generic item description to an organic amount of compensation. Alternatively, the online concierge system 102 applies a conversion factor to the amount of compensation the online concierge system 102 receives for displaying 430 information describing the specific item associated with the selected generic item description (or for the user purchasing the specific item associated with the selected generic item description) to a compensated probability. Converting the amount of compensation received by the online concierge system 102 for displaying 430 information describing a selected generic item description and the probability of the user purchasing the item into a common unit of measurement allows the online concierge system 102 to calculate a value for each specific item associated with the selected generic item description, both specific items associated with the selected generic item description for which the online concierge system 102 receives compensation for displaying 430 (or for the user purchasing) and specific items associated with the selected generic item description for which the online concierge system 102 does not receive compensation for displaying 430 (or for the user purchasing). The online concierge system 102 ranks the specific items associated with the selected generic item description based on their corresponding values and displays 430 information describing specific items associated with the selected generic item description having at least a threshold position in the ranking. In various embodiments, the online concierge system 102 may also account for predicted availabilities of specific items associated with the selected generic item description and display 430 information describing specific items associated with the selected generic item description having at least the threshold position in the ranking based on values and having at least a threshold predicted availability at the warehouse 110 identified by the request to create an order. Alternatively, the online concierge system 102 selects specific items associated with the selected generic item description having at least the threshold availability at the warehouse 110 and displays 430 information describing selected specific items associated with the selected generic item description having at least a threshold value or having at least a threshold position in a ranking based on the values.

Figure 6:
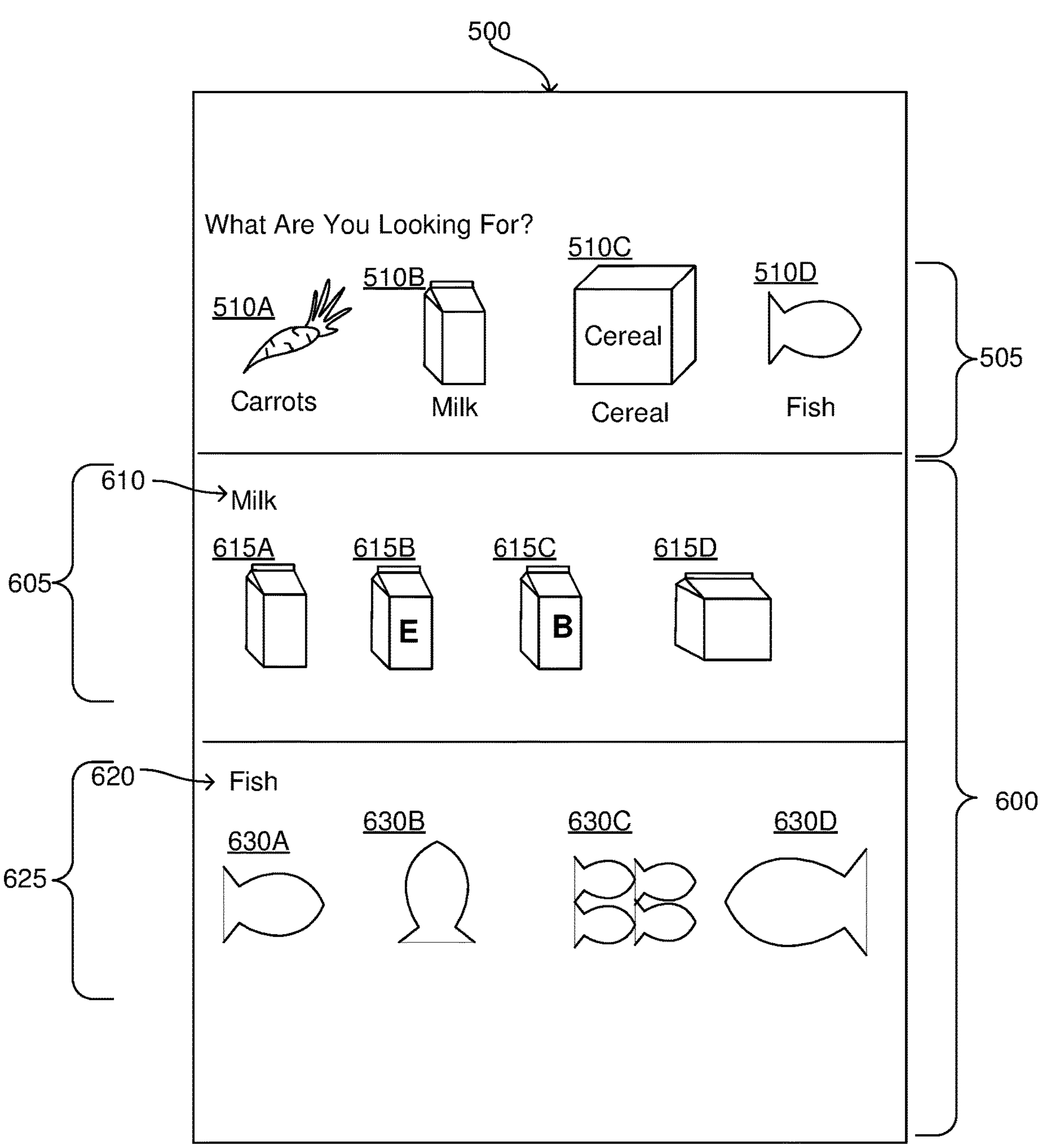
FIG. 6 an example of the interface displayed to a user by the online concierge system after the online concierge system receives a selection of a generic item description from the user, in accordance with an embodiment.

FIG. 6 shows an example of the interface 500 displayed to a user by the online concierge system 102 after the online concierge system 102 receives a selection of a generic item description from the user. As further described above in conjunction with FIG. 5, the interface 500 includes a generic item description region 505 in which depictions 510A, 510B, 510C, 510D (also referred to individually and collectively using reference number 510) of different generic item descriptions of the set are displayed. In the examples of FIGS. 5 and 6, the generic item description region 505 is a horizontally scrollable list including multiple positions, with each position displaying a depiction 510 of a generic item description of the set.

In the example of FIG. 6, the online concierge system 102 received a selection of depiction 510B of a generic item description from the user. For example, the interface 500 receives a selection input from the user selecting depiction 510B and transmits information identifying the generic item description corresponding to depiction 510B to the online concierge system 102 indicating selection by the user. The online concierge system 102 identifies specific items associated with the generic item description corresponding to depiction 510B and updates the interface 500 to display one or more of the specific items associated with the generic item description selected by the user, as further described above in conjunction with FIG. 4.

In the example of FIG. 6, the interface 500 includes an item description region 600 in which information describing different specific items corresponding to a generic item description is displayed. For example, the item description region 600 includes different positions, with each position corresponding to a selected generic item description. Hence, in the example of FIG. 6, position 605 corresponds to the generic item description selected by user interaction with depiction 510B of the generic item description. Position 605 displays an identifier 610 of the generic item description corresponding to position 605, so in the example of FIG. 6, position 605 includes an identifier 610 of the generic item description corresponding to the selected depiction 510B. While FIG. 6 shows the identifier 610 of the generic item description for position 605 as text, in other embodiments, the identifier 610 is an image, a combination of image and text data, or other suitable information describing a generic item description selected by the user.

Position 605 includes multiple slots, with each slot displaying information describing a specific item 615A, 615B, 615C, 615D (also referred to individually and collectively using reference number 615) associated with the generic item description selected by the user. In the example of FIG. 6, different slots in position 605 display images corresponding to different specific items 615A, 615B, 615C, 615D associated with the generic item description selected by the user. However, in other embodiments, any suitable information identifying specific items 615A, 615B, 615C, 615D are displayed in different slots of position 605. Example information identifying a specific item 615 includes an image of the specific item 615, a price of the specific item 615, a name of the specific item 615, a title of the specific item 615, or any other suitable descriptive information allowing the user to identify the specific item 615. In various embodiments, the online concierge system 102 initially displays information identifying a set of specific items 615A, 615B, 615C, 615D in slots of the position 605. The online concierge system 102 determines the set of specific items 615A, 615B, 615C, 615D for which identifying information is displayed via slots of position 605, as further described above in conjunction with FIG. 4. In various embodiments, the position 605 displays information describing different specific items 615 in a determined order. For example, the online concierge system 102 ranks specific items 615 based on their availability at a warehouse identified by the user or based on their probabilities of being purchased by the user, with generic item descriptions having higher availabilities or higher probabilities of being purchased by the user having higher positions in the ranking. The position 605 for the generic item description selected by the user displays information describing specific items 615 associated with the selected generic item description in an order based on the ranking, with descriptions of specific items 615 having higher positions in the ranking displayed in more prominent or more readily accessible slots of the position 605.

In the example of FIG. 6, position 605 is a horizontally scrollable list including multiple slots, with each slot displaying information describing a specific item 615 associated with the generic item description corresponding to the slot. Similarly, the interface 500 displays different positions 605 correspond to different selected generic item descriptions along a vertical axis, while displaying information describing specific items 615 horizontally. Hence, in some embodiments, the interface 500 displays information identifying generic item descriptions selected by the user along a first axis and displays information identifying specific items associated with a generic item description along a second axis that is perpendicular to the first axis. Such a configuration allows the user to more easily generate an order from a warehouse 110 by initially selecting one or more generic item descriptions from the interface 500 and subsequently reviewing or selecting specific items associated with a selected generic item description from the interface 500. As further described above, when generating the interface 500, the online concierge system 102 orders display of generic item descriptions or specific items corresponding to a selected generic item description within the interface 500 so generic item descriptions more frequently included in orders by the user or items more likely to be purchased or more likely to be available at a specified warehouse 110 are more prominently displayed or are more readily accessible to the user.

Referring back to FIG. 4, in response to receiving a selection of a specific item associated with the selected generic item description, the online concierge system 102 includes 435 the selected specific item in an order for the user. Hence, the user generates an order identifying specific items to obtain from an identified warehouse 110 by selecting one or more specific items displayed 430 via the interface. Thus, the online concierge system 102 allows the user to generate an order via the interface by selecting generic item descriptions via the interface and selecting specific items associated with one or more of the selected generic item descriptions displayed to the user via the interface. When the online concierge system 102 receives 420 a selection of an additional generic item description from the user via the interface, the online concierge system 102 identifies 425 additional specific items each associated with the additional generic item description, as further described above. This online concierge system 102 modifies the interface to display 430 the additional specific items associated with the generic item description. In various embodiments, the online concierge system 102 displays identifiers of selected generic item descriptions in different positions along an axis of the interface. For a selected generic item description, the interface displays 430 specific items associated with the selected generic item description in different slots of a position corresponding to the selected generic item description, with different slots of the position along an additional axis that is perpendicular to the axis of the positions. In some embodiments, the interface vertically displays information identifying selected generic item descriptions and horizontally displays specific items associated with a selected generic item description. Such a configuration allows the user to more easily generate an order from a warehouse 110 by initially selecting one or more generic item descriptions from the interface and subsequently reviewing or selecting specific items associated with a selected generic item description from the interface. As further described above, when generating the interface, the online concierge system orders display of generic item descriptions or specific items corresponding to a selected generic item description within the interface so generic item descriptions more frequently included in orders by the user or items more likely to be purchased or more likely to be available at a specified warehouse are more prominently displayed or are more readily accessible to the user.

Referring again to FIG. 6, the online concierge system 102 also received a user interaction with depiction 510D of an additional generic item description, so FIG. 6 shows the interface 500 after user interaction with depiction 510B of a generic item description and with depiction 510D of an additional generic item description. The user interaction with depiction 510D of the additional generic item description causes interface 500 to display an identifier 625 of the additional generic item description corresponding to the additionally selected depiction 510D in an additional position 625. Hence, position 605 corresponds to selected depiction 510B of a generic item description, while additional position 625 corresponds to selected depiction 510D of an additional generic item description. While FIG. 6 shows the identifier 625 of the additional generic item description as text, in other embodiments, the identifier 610 is an image, a combination of image and text data, or other suitable information describing a generic item description selected by the user.

Additional position 625 includes multiple additional slots, with each additional slot displaying information describing a specific item 630A, 630B, 630C, 630D (also referred to individually and collectively using reference number 630) associated with the additional generic item description selected by the user. In the example of FIG. 6, different additional slots in additional position 625 display images corresponding to different specific items 630A, 630B, 630C, 630D associated with the additional generic item description selected by the user. However, in other embodiments, any suitable information identifying specific items 630A, 630B, 630C, 630D are displayed in different slots of additional position 625. Example information identifying a specific item 630 includes an image of the specific item 630, a price of the specific item 630, a name of the specific item 630, a title of the specific item 630, or any other suitable descriptive information allowing the user to identify the specific item 630 In various embodiments, the online concierge system 102 initially displays information identifying a set of specific items 630A, 630B, 630C, 630D in slots of the additional position 625. The online concierge system 102 determines the set of specific items 630A, 630B, 630C, 630D for which identifying information is displayed via slots of additional position 625, as further described above in conjunction with FIG. 4. In various embodiments, the additional position 625 displays information describing different specific items 630 in a determined order. For example, the online concierge system 102 ranks specific items 630 based on their availability at a warehouse identified by the user or based on their probabilities of being purchased by the user, with generic item descriptions having higher availabilities or higher probabilities of being purchased by the user having higher positions in the ranking. The additional position 625 for the additional generic item description selected by the user displays information describing specific items 630 associated with the selected generic item description in an order based on the ranking, with descriptions of specific items 615 having higher positions in the ranking displayed in more prominent or more readily accessible slots of the additional position 625.

In the example shown by FIG. 6, the interface 500 displays positions corresponding to different selected generic item descriptions in different portions of the interface 500, with a portion of the interface 500 corresponding to a selected generic item description displaying information identifying specific items associated with the selected generic item description. Such a configuration allows the user to more easily generate an order from a warehouse 110 by initially selecting one or more generic item descriptions from the interface and subsequently reviewing or selecting specific items associated with a selected generic item description from the interface.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for customizing a user-specific interface, the method comprising:

storing a taxonomy at an online concierge system, the taxonomy associating one or more generic data descriptions with one or more specific data records associated with a location;

causing to display the interface at a client device of a user, the interface including a region displaying depictions of different selected generic data descriptions, the region comprising a plurality of positions along a first axis, each position comprising a plurality of slots along a second axis different from the first axis;

receiving, at the online concierge system and via the interface, a selection of a first generic data description at a first position along the first axis and a selection of a second generic data description at a second position along the first axis;

automatically populating the user interface with specific data records at the slots of the first position and the slots of the second position based on the first generic data description and the second generic data description, wherein automatically populating the specific data records;

identifying a first set of candidate data records based on the first generic data description in the taxonomy and a second set of candidate data records based on the second generic data description in the taxonomy;

applying a machine-learned item availability model to predict a dynamic parameter at the location for each candidate data record of the first set or the second set, the dynamic parameter indicating a predicted availability status associated with the location of each candidate data record, wherein the machine-learned item availability model is trained by:

collecting a training dataset comprising a plurality of historical order outcomes, each historical order outcome indicating whether an item was successfully picked from a warehouse for a delivery order;

extracting, from the training dataset, a plurality of training features for each item-warehouse pair, the plurality of training features comprising at least item identifiers, warehouse identifiers, and timing information;

incorporating warehouse inventory signals into the training features, the warehouse inventory signals comprising at least one of last-found timestamps, last-not-found timestamps, or find rates associated with the item-warehouse pair;

training the machine-learned item availability model using the training features to predict a probability that the item is available at the warehouse based on the collected historical order outcomes; and retraining the machine-learned item availability model as new historical order outcomes become available;

selecting specific data records associated with the first generic data description based on the predicted dynamic parameter; and selecting additional specific data records associated with the second generic data description based on the predicted dynamic parameter;

forming the user-specific interface that is customized to the user based on the user's selection of the first generic data description and the second generic data description and based on the dynamic parameters at the location indicating the predicted availability status associated with the data records, wherein forming the user-specific interface comprises:

causing to display the selected specific data records at the slots of the first position along the axis of the interface including an identifier of the first generic data description, causing to display the selected additional specific data records at the slots of the second position along the axis.

2. The method of claim 1, further comprising selecting a set of generic data descriptions for the user based on orders previously received by the online concierge system, wherein selecting the set of generic data descriptions for the user based on orders previously received by the online concierge system comprises:

retrieving one or more orders the online concierge system previously received from the user;

identifying data records included in one or more of the retrieved orders;

determining a generic data description corresponding to each identified data record included in at least one retrieved order;

selecting the set of generic data descriptions based on frequencies with which data records corresponding to generic data descriptions were included in the retrieved one or more orders.

3. The method of claim 2, further comprising selecting a set of generic data descriptions for the user based on orders previously received by the online concierge system, wherein selecting the set of generic data descriptions based on frequencies with which data records corresponding to generic data descriptions were included in the retrieved one or more orders comprises:

selecting generic data descriptions corresponding to data records included in at least a threshold percentage of the retrieved one or more orders.

4. The method of claim 2, further comprising selecting a set of generic data descriptions for the user based on orders previously received by the online concierge system, wherein selecting the set of generic data descriptions based on frequencies with which data records corresponding to generic data descriptions were included in the retrieved one or more orders comprises:

ranking generic data descriptions corresponding to data records included the retrieved one or more orders, a position in the ranking of a generic data description based on a percentage of the retrieved one or more orders including a data record corresponding to the generic data description; and selecting generic data descriptions having at least a threshold position in the ranking.

5. The method of claim 1, further comprising selecting a set of generic data descriptions for the user based on orders previously received by the online concierge system, wherein selecting the set of generic data descriptions for the user based on orders previously received by the online concierge system comprises:

determining a location of the user;

selecting a geographic region including the location of the user;

retrieving one or more orders the online concierge system previously received that identify one or more locations within the geographic region;

identifying data records included in one or more of the retrieved orders;

determining a generic data description corresponding to each identified data record included in at least one retrieved order; and selecting the set of generic data descriptions based on frequencies with which data records corresponding to generic data descriptions were included in the retrieved one or more orders.

6. The method of claim 1, further comprising selecting a set of generic data descriptions for the user based on orders previously received by the online concierge system, wherein selecting the set of generic data descriptions for the user based on orders previously received by the online concierge system comprises:

selecting a predetermined list of generic data descriptions as the set in response to the online concierge system having previously received less than a threshold number of orders from the user.

7. The method of claim 1, further comprising selecting a set of generic data descriptions for the user based on orders previously received by the online concierge system, wherein selecting the set of generic data descriptions for the user based on orders previously received by the online concierge system comprises:

selecting a recipe including generic data descriptions and instructions for combining the included generic data descriptions; and selecting the set of generic data descriptions as generic data descriptions included in the selected recipe.

8. The method of claim 1, wherein modifying the interface further comprises:

determining a probability of the user purchasing each identified specific data record associated with the first generic data description;

ranking the identified specific data records associated with the first generic data description based on the determined probabilities; and displaying information identifying one or more identified specific data records in the interface based on the ranking.

9. The method of claim 8, wherein displaying information identifying one or more identified specific data records based on the ranking comprises:

displaying identified specific data records in different slots of the position, a slot in which an identified specific data record is displayed corresponding to a position in the ranking of the identified specific data record.

10. The method of claim 8, wherein displaying information identifying one or more identified specific data records based on the ranking comprises:

determining a predicted availability of each identified specific data record at a warehouse identified by an order; and displaying identified specific data records having at least a threshold predicted availability in different slots of the position, a slot in which an identified specific data record is displayed corresponding to a position in the ranking of the identified specific data record.

11. The method of claim 1, wherein the selected specific data records displayed at the slots of the first position are ranked by the predicted availability.

12. The method of claim 1, wherein the slots of the first position are displayed on an additional axis perpendicular to the axis.

13. A computer program product comprising a non-transitory computer readable storage medium having instructions encoded thereon, the instructions for customizing a user-specific interface, wherein the instructions, when executed by a processor, cause the processor to:

store a taxonomy at an online concierge system, the taxonomy associating one or more generic data descriptions with one or more specific data records associated with a location;

cause to display the interface at a client device of a user, the interface including a region displaying depictions of different selected generic data descriptions, the region comprising a plurality of positions along a first axis, each position comprising a plurality of slots along a second axis different from the first axis;

receive, at the online concierge system and via the interface, a selection of a first generic data description at a first position along the first axis and a selection of a second generic data description at a second position along the first axis;

automatically populate the user interface with specific data records at the slots of the first position and the slots of the second position based on the first generic data description and the second generic data description, wherein automatically populating the specific data records;

identifying a first set of candidate data records based on the first generic data description in the taxonomy and a second set of candidate data records based on the second generic data description in the taxonomy;

applying a machine-learned item availability model to predict a dynamic parameter at the location for each candidate data record of the first set or the second set, the dynamic parameter indicating a predicted availability status associated with the location of each candidate data record, wherein the machine-learned item availability model is trained by:

collecting a training dataset comprising a plurality of historical order outcomes, each historical order outcome indicating whether an item was successfully picked from a warehouse for a delivery order;

extracting, from the training dataset, a plurality of training features for each item-warehouse pair, the plurality of training features comprising at least item identifiers, warehouse identifiers, and timing information;

incorporating warehouse inventory signals into the training features, the warehouse inventory signals comprising at least one of last-found timestamps, last-not-found timestamps, or find rates associated with the item-warehouse pair;

training the machine-learned item availability model using the training features to predict a probability that the item is available at the warehouse based on the collected historical order outcomes; and retraining the machine-learned item availability model as new historical order outcomes become available;

selecting specific data records associated with the first generic data description based on the predicted dynamic parameter;

selecting additional specific data records associated with the second generic data description based on the predicted dynamic parameter; and form the user-specific interface that is customized to the user based on the user's selection of the first generic data description and the second generic data description and based on the dynamic parameters at the location indicating the predicted availability status associated with the data records, wherein forming the user-specific interface comprises:

causing to display the selected specific data records at the slots of the first position along the axis of the interface including an identifier of the first generic data description, causing to display the selected additional specific data records at the slots of the second position along the axis.

14. The computer program product of claim 13, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

retrieve one or more orders the online concierge system previously received from the user;

identify data records included in one or more of the retrieved orders;

determine a generic data description corresponding to each identified data record included in at least one retrieved order;

select the set of generic data descriptions based on frequencies with which data records corresponding to generic data descriptions were included in the retrieved one or more orders.

15. The computer program product of claim 14, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

select generic data descriptions corresponding to data records included in at least a threshold percentage of the retrieved one or more orders.

16. The computer program product of claim 14, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

rank generic data descriptions corresponding to data records included the retrieved one or more orders, a position in the ranking of a generic data description based on a percentage of the retrieved one or more orders including a data record corresponding to the generic data description; and select generic data descriptions having at least a threshold position in the ranking.

17. The computer program product of claim 13, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

determine a location of the user;

select a geographic region including the location of the user;

retrieve one or more orders the online concierge system previously received that identify one or more locations within the geographic region;

identify data records included in one or more of the retrieved orders;

determine a generic data description corresponding to each identified data record included in at least one retrieved order; and select the set of generic data descriptions based on frequencies with which data records corresponding to generic data descriptions were included in the retrieved one or more orders.

18. The computer program product of claim 13, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

select a predetermined list of generic data descriptions as the set in response to the online concierge system having previously received less than a threshold number of orders from the user.

19. The computer program product of claim 13, wherein the instructions, when executed, further cause the processor to select a set of generic data descriptions for the user based on orders previously received by the online concierge system, and wherein the instruction to select the set of generic data descriptions for the user based on orders previously received by the online concierge system comprises instructions to:

select a recipe including generic data descriptions and instructions for combining the included generic data descriptions; and select the set of generic data descriptions as generic data descriptions included in the selected recipe.

20. The computer program product of claim 13, wherein the instruction to modify the interface to display the set of the identified specific data records in a position of the interface corresponding to the selected generic data descriptions comprises instructions to:

determine a probability of the user purchasing each identified specific data record associated with the first generic data description;

rank the identified specific data records associated with the first generic data description based on the determined probabilities; and display information identifying one or more identified specific data records in the interface based on the ranking.

21. The computer program product of claim 20, wherein the instruction to display information identifying one or more identified specific data records based on the ranking comprises instructions to:

display identified specific data records in different slots of the position, a slot in which an identified specific data record is displayed corresponding to a position in the ranking of the identified specific data record.

22. The computer program product of claim 20, wherein the instruction to display information identifying one or more identified specific data records based on the ranking comprises instructions to:

display identified specific data records in different slots of the position, a slot in which an identified specific data record is displayed corresponding to a position in the ranking of the identified specific data record.

23. The computer program product of claim 13, wherein the instruction to modify the interface further comprises instructions to:

determine a predicted availability of each identified specific data record at a warehouse identified by an order; and display identified specific data records having at least a threshold predicted availability in different slots of the position, a slot in which an identified specific data record is displayed corresponding to a position in the ranking of the identified specific data record.

24. A system comprising:

a processor; and memory configured to store instructions for customizing a user-specific interface, wherein the instructions, when executed by the processor, cause the processor to:

store a taxonomy at an online concierge system, the taxonomy associating one or more generic data descriptions with one or more specific data records associated with a location;

cause to display the interface at a client device of a user, the interface including a region displaying depictions of different selected generic data descriptions, the region comprising a plurality of positions along a first axis, each position comprising a plurality of slots along a second axis different from the first axis;

receive, at the online concierge system and via the interface, a selection of a first generic data description at a first position along the first axis and a selection of a second generic data description at a second position along the first axis;

automatically populate the user interface with specific data records at the slots of the first position and the slots of the second position based on the first generic data description and the second generic data description, wherein automatically populating the specific data records;

identifying a first set of candidate data records based on the first generic data description in the taxonomy and a second set of candidate data records based on the second generic data description in the taxonomy;

applying a machine-learned item availability model to predict a dynamic parameter at the location for each candidate data record of the first set or the second set, the dynamic parameter indicating a predicted availability status associated with the location of each candidate data record, wherein the machine-learned item availability model is trained by:

collecting a training dataset comprising a plurality of historical order outcomes, each historical order outcome indicating whether an item was successfully picked from a warehouse for a delivery order:

extracting, from the training dataset, a plurality of training features for each item-warehouse pair, the plurality of training features comprising at least item identifiers, warehouse identifiers, and timing information;

incorporating warehouse inventory signals into the training features, the warehouse inventory signals comprising at least one of last-found timestamps, last-not-found timestamps, or find rates associated with the item-warehouse pair;

training the machine-learned item availability model using the training features to predict a probability that the item is available at the warehouse based on the collected historical order outcomes; and retraining the machine-learned item availability model as new historical order outcomes become available;

selecting specific data records associated with the first generic data description based on the predicted dynamic parameter;

selecting additional specific data records associated with the second generic data description based on the predicted dynamic parameter; and form the user-specific interface that is customized to the user based on the user's selection of the first generic data description and the second generic data description and based on the dynamic parameters at the location indicating the predicted availability status associated with the data records, wherein forming the user-specific interface comprises:

causing to display the selected specific data records at the slots of the first position along the axis of the interface including an identifier of the first generic data description, causing to display the selected additional specific data records at the slots of the second position along the axis.

* * * * *